United States Patent [19]

Shubert

[11] 4,084,573
[45] Apr. 18, 1978

[54] PYRAMIDAL SOLAR HEATER

[76] Inventor: Nick J. Shubert, 893 E. Indianola Ave., Youngstown, Ohio 44502

[21] Appl. No.: 705,588

[22] Filed: Jul. 15, 1976

[51] Int. Cl.² .............................................. F24J 3/02
[52] U.S. Cl. ................................... 126/270; 237/1 A
[58] Field of Search ............... 126/270, 271; 237/1 A; 165/48

[56] References Cited

U.S. PATENT DOCUMENTS

| 3,949,732 | 4/1976 | Reines | 126/271 |
| 3,955,555 | 5/1976 | Bostrom | 126/270 |

FOREIGN PATENT DOCUMENTS

| 2,511,861 | 10/1975 | Germany | 126/271 |
| 259,001 | 4/1913 | Germany | 237/1 A |

Primary Examiner—Kenneth W. Sprague
Assistant Examiner—James C. Yeung
Attorney, Agent, or Firm—Webster B. Harpman

[57] ABSTRACT

A pyramidal solar heater for a dwelling house or other building takes the form of a pyramidal structure formed of translucent plastic or like material having heat absorbing properties and includes a second pyramidal structure spaced inwardly thereof together with an air moving device for circulating air from the dwelling house or other building against the solar heated translucent plastic pyramidal device.

7 Claims, 2 Drawing Figures

PYRAMIDAL SOLAR HEATER

BACKGROUND OF THE INVENTION

1. Field of the Invention

This invention relates to solar heaters wherein sunlight and its heat energy is absorbed and transferred to moving air in an enclosure.

2. Description of the Prior Art

Prior solar heaters have utilized transparent and translucent panels for heating air within an enclosure formed thereof. See for example U.S. Pat. Nos. 2,998,005 and 3,244,486. Other solar heating proposals have included utilizing the attic space in a dwelling as in U.S. Pat. No. 2,780,415 and still other patents arrange heat exchangers in boxes exposed to the sunlight as in U.S. Pat. No. 3,902,474.

Pyramidal structures not heretofore considered as useful solar heaters may be seen in U.S. Pat. Nos. 2,982,054 and 3,577,691. A thermoplastic heat responsive fire venting apparatus includes a modified pyramidal structure, the surfaces being bowed as disclosed in U.S. Pat. No. 3,918,226.

This invention provides a double hollow pyramidal shape exposed to the sunlight and incorporates air moving means for moving heated air from the inner surface of the outer one of the double pyramidal shaped structures so as to heat a room in association therewith.

SUMMARY OF THE INVENTION

A pyramidal solar heater is formed of translucent heat absorbing plastic material or the like provided with a spaced, smaller pyramidal structure and air moving means whereby heated air may be moved out of the pyramidal solar heater downwardly into a room or enclosure therebelow.

DESCRIPTION OF THE PREFERRED EMBODIMENT

Figure 1:
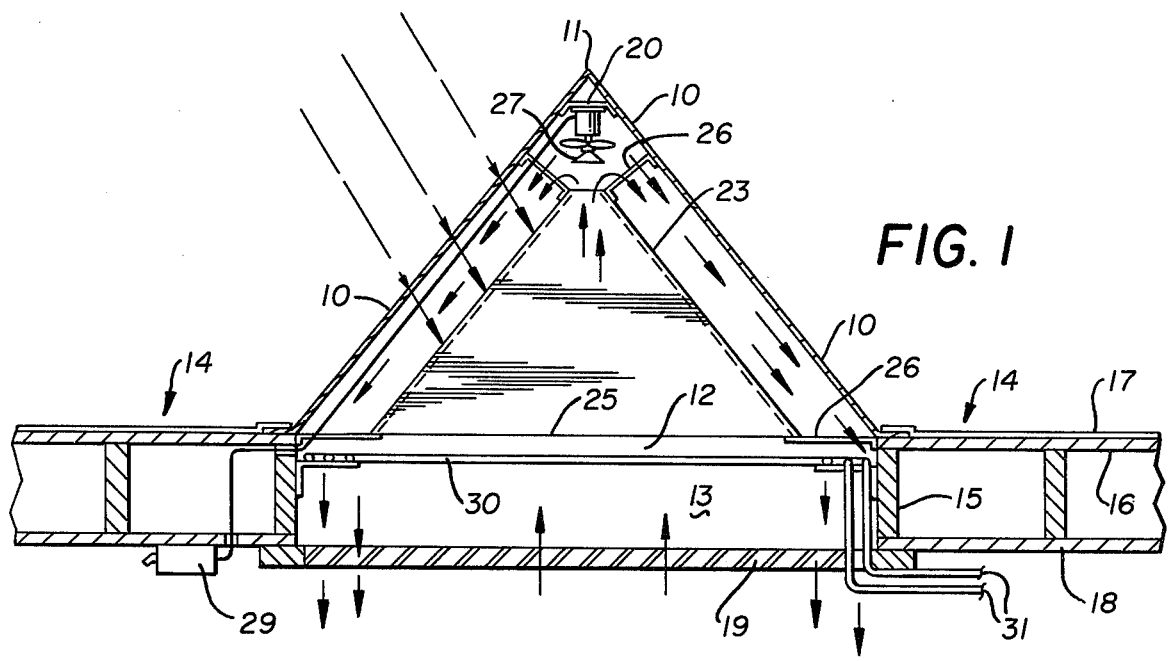
FIG. 1 is a vertical section through a portion of a roof and a pyramidal solar heater positioned in an opening therein.
Figure 2:
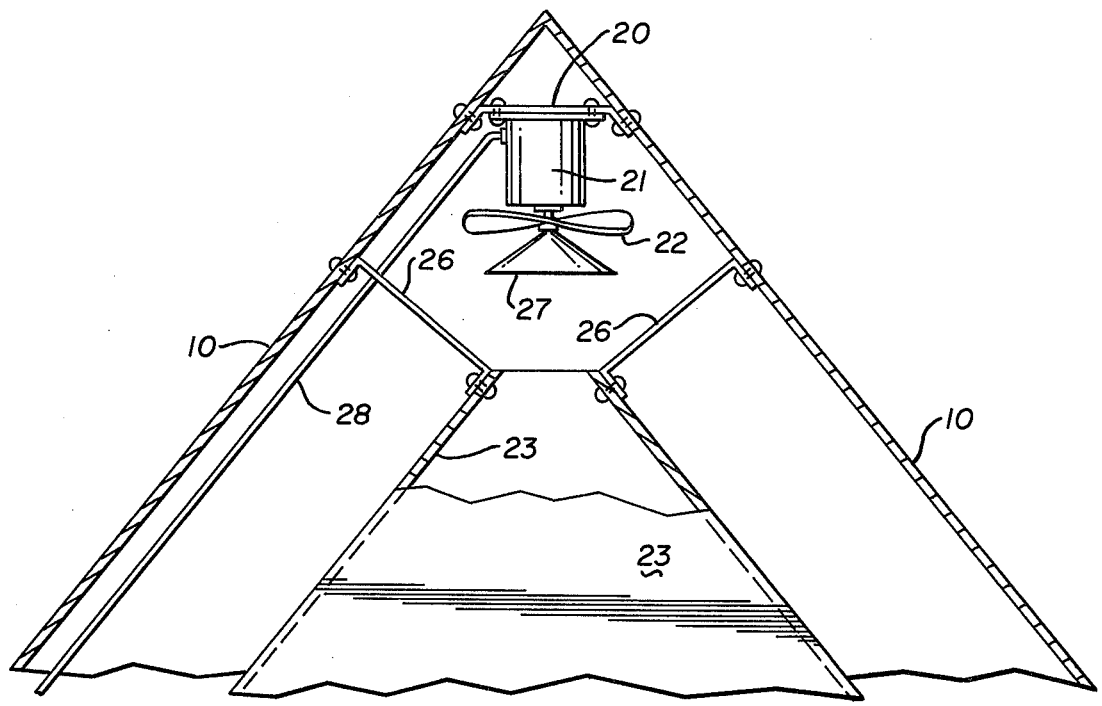
FIG. 2 is an enlarged detail of the upper portion of the pyramidal solar heater seen in FIG. 1

In the form of the invention chosen for illustration herein, the pyramidal solar heater may be seen in FIG. 1 to comprise a pyramid formed of four triangular shaped panels 10, having a common peak 11 and an open square bottom 12. The pyramidal solar heater may be of any desired size and as disclosed in FIG. 1 of the drawings it is positioned in registry with an opening 13 in a roof structure 14 of a building. The roof structure includes joists 15, roofing boards 16, roofing material 17 and a ceiling 18. A grille 19 is positioned on the ceiling 18 so as to register with the opening 13 in the roof structure 14. A bracket 20 is positioned adjacent the peak 11 of the pyramidal solar heater and an air moving device such as an electric motor 21 and a fan 22 driven thereby are mounted on the bracket 20 as best seen in FIG. 2 of the drawings. The triangular panels 10 of the pyramidal solar heater are formed of heat absorbing shaded or translucent plastic material or the like characterized by its ability to convert light energy to heat energy. The panels 10 may accordingly be tinted plastic such as Lucite or alternately tinted window glass, both of which products will be familar to those skilled in the art, and both of which convert light energy to heat energy.

Still referring to FIG. 1 of the drawings, it will be seen that there is a smaller pyramidal structure 23 positioned inwardly in spaced relation to the four triangular panels 10 of the pyramidal solar heater. The apex of the inner pyramidal structure 23 is cut off to form a small square opening 24 and the bottom of the secondary pyramidal structure 23 is open as at 25. The smaller pyramidal structure 23 may be formed of any suitable material and it is supported adjacent its uppermost and lowermost ends by a plurality of small individual arms 26.

By referring now to FIG. 2 of the drawings it will be seen that the rotating shaft of the electric motor 21 on which the fan 22 is carried also supports a deflector cone 27. The electric motor 21 is provided with an energizing circuit 28 and by referring to FIG. 1 it will be seen that this extends downwardly through the roof structure 14 and to a thermostatic control 29 which in turn is connected with a suitable power source.

A tubular heat exchanger 30 is seen arranged in a substantially square configuration and positioned around the outer edges of the opening 13 in the roof structure and pipes 31 extend from the heat exchanger as desired.

In operation the pyramidal solar heater acts to receive sunlight regardless of the direction of the sun with respect to the heater and the inclination of the suns rays engaging the same as the four triangular panels 10 of the solar heater provide almost universal directional alignment with the sun at all times. The suns rays engaging the four triangular panels 10 create heat on the inner side thereof due to the characteristic of the panel material and this may be enhanced by heat absorption qualities of the smaller pyramidal structure 23 positioned within the solar heater. The energization of the electric motor 10 revolves the fan 22 and moves the air downwardly between the pyramidal solar heater and the smaller pyramidal structure in a wiping action which moves the warmed air downwardly and is in turn heated by convection. The warm air moves downwardly as indicated by the arrows in FIG. 1 of the drawings and through the opening 13 in the roof structure 14 through the grille 19 and into the room or other enclosure. If supplemental heating at a distance is desired, the tubular heat exchanger 30 is supplied with a fluid such as water circulated slowly therethrough and the same is heated by the warm air flowing downwardly thereover. Cool air enters the solar heater through the center section of the grille 19 and moves upwardly through the interior of the smaller pyramidal structure 23 and out of the small square opening in the upper end thereof where it is directed downwardly by the fan and the directional cone 27 heretofore described. It will thus be seen that a solar heater has been disclosed which has the novel ability of presenting a relatively large surface area to the sun regardless of the time of day and the positioning of the sun relative to the solar heater.

Experiments with a solar heater the height of the triangular panels 10 being 12 inches, has determined that it will raise the temperature in a 30 × 30 room approximately 25° over a period of 6 hours.

Although but one embodiment of the present invention has been illustrated and described, it will be apparent to those skilled in the art that various changes and modifications may be made therein without departing from the spirit of the invention and having thus described my invention what I claim is:

1. A solar heater comprising a pyramidal shaped structure having a square base and sloping sides meeting at an apex, said sides formed of translucent material, said base defining an open bottom positioned in registry with an opening in a supporting structure, a smaller similarly formed pyramidal shaped structure disposed within said first mentioned pyramidal shaped structure in spaced relation thereto and having an opening in its uppermost end, air moving means positioned in the apex of said first mentioned pyramidal shaped structure for moving air downwardly in wiping relation to said first mentioned pyramidal shaped structure.

2. The pyramidal solar heater set forth in claim 1 wherein said first mentioned pyramidal structure is formed of four equally sized similarly shaped triangular panels of translucent plastic material.

3. The pyramidal solar heater set forth in claim 1 wherein said first mentioned pyramidal structure is formed of four equally sized similarly shaped triangular panels of tinted plastic material.

4. The pyramidal solar heater set forth in claim 1 wherein said first mentioned pyramidal structure is formed of four equally sized similarly shaped triangular panels of tinted glass.

5. The pyramidal solar heater of claim 1 and wherein the air moving means is an electric fan, a conical air deflector on said fan for directing the air outwardly and downwardly.

6. The pyramidal solar heater set forth in claim 1 wherein the smaller pyramidal structure is formed of heat absorbing material.

7. The pyramidal solar heater as set forth in claim 1 wherein a tubular heat exchanger is disposed beneath the open bottom of said pyramidal solar heater.

* * * * *